United States Patent
Alexander et al.

(10) Patent No.: US 7,617,532 B1
(45) Date of Patent: Nov. 10, 2009

(54) PROTECTION OF SENSITIVE DATA FROM MALICIOUS E-MAIL

(75) Inventors: Christopher Alexander, Canoga Park, CA (US); Carey Nachenberg, Northridge, CA (US)

(73) Assignee: Symantec Corporation, Mountain View, CA (US)

( * ) Notice: Subject to any disclaimer, the term of this patent is extended or adjusted under 35 U.S.C. 154(b) by 690 days.

(21) Appl. No.: 11/041,325

(22) Filed: Jan. 24, 2005

(51) Int. Cl.
*G06F 21/22* (2006.01)
(52) U.S. Cl. .............. 726/22; 713/154; 726/26
(58) Field of Classification Search ............. 726/22, 726/26
See application file for complete search history.

(56) References Cited

U.S. PATENT DOCUMENTS

| | | | |
|---|---|---|---|
| 7,228,564 B2 * | 6/2007 | Raikar et al. | 726/23 |
| 2002/0087479 A1 * | 7/2002 | Malcolm | 705/64 |
| 2005/0055569 A1 * | 3/2005 | Shipp | 713/201 |
| 2005/0246242 A1 * | 11/2005 | Proctor | 705/26 |
| 2005/0257261 A1 * | 11/2005 | Shraim et al. | 726/22 |
| 2006/0021031 A1 * | 1/2006 | Leahy et al. | 726/22 |
| 2006/0101334 A1 * | 5/2006 | Liao et al. | 715/523 |
| 2007/0039038 A1 * | 2/2007 | Goodman et al. | 726/2 |

OTHER PUBLICATIONS

Gregg Tally et al., Anti-Phishing: Best Practices for institutions and consumers, Sep. 2004, McAfee Inc, Technical Report# 04-004, pp. 24-26.*
Dyck, Timothy, Review: Teros-100 APS 2.1.1, [Online] May 28, 2003, [Retrieved from the Internet on Oct. 6, 2004] Retrieved from the Internet: <URL: http://www.eweek.com/article2/0,1759,1110435,00.asp>.

* cited by examiner

*Primary Examiner*—Jung Kim
*Assistant Examiner*—Izunna Okeke
(74) *Attorney, Agent, or Firm*—Fenwick & West LLP

(57) ABSTRACT

Methods, apparatuses, and computer-readable media protect sensitive data from being submitted in response to malicious e-mail. Responsive to initiating interaction with a remote site by clicking on a link, a method for protecting sensitive data from being submitted to a suspicious remote site responsive to a malicious e-mail comprises the steps of determining whether each remote target site a user attempts to access requests input of sensitive data; monitoring transmissions between a user's computer and remote target sites; and determining that a suspicious remote site is attempting to glean sensitive data from the user, responsive to a condition from a group of conditions consisting of: determining that a remote target site the user is attempting to access requests input of sensitive data; and detecting an attempt to transmit sensitive data between the user's computer and a remote target site.

33 Claims, 4 Drawing Sheets

PROTECTION OF SENSITIVE DATA FROM MALICIOUS E-MAIL

TECHNICAL FIELD

The present invention relates to protecting sensitive information, and more particularly to a method for protecting sensitive data from being submitted to a suspicious remote site responsive to a malicious e-mail.

BACKGROUND ART

The advent of connecting two or more computers to form a network has dramatically altered the way business and personal transactions take place. Aspects such as e-mail, file transfers, surfing the web, instant messaging, e-commerce, and more are becoming day-to-day occurrences. The arrival of this technology also brought with the challenge of protecting sensitive information on a system that, by its very nature, is built for information exchange. Networks serve as the repository of a great deal of sensitive information. This storehouse of information has not gone unnoticed by would be thieves and con artists. As techniques to convey sensitive information over a network have evolved, so have attempts to pilfer that information. One such means by which thieves trick users into providing sensitive information is called Phishing.

Phishing is a fraudulent e-mail campaign that attempts to elicit confidential and/or financial information from unwitting victims. Phishing generally entails sending large numbers of e-mails with compelling reasons why the recipient should click on a link to an official-looking, yet bogus, website. Once there, the user is encouraged to input confidential information such as credit card, Social Security, and bank account numbers.

Proposals for limiting the effectiveness of phishing include e-mail authentication techniques using antispam standards and scanning for "cousin"

domains, whereby trademark owners would be notified when a similar sounding Uniform Resource Locator (URL) or site contains spoofed content. Features such as Norton Privacy Control in Symantec's Norton Internet Security (NIS) product and McAfee Personal Firewall help to stem the increasing number of phishing attacks by allowing users to identify confidential data that they wish to protect. Upon seeing the specific confidential data being transmitted via HTTP (via the web), instant messenger, or SMTP (via e-mail), the user is notified of the pending release of confidential information, and prompted to provide verification that the disclosure is authorized. Unfortunately, when a phishing attack is successful, the user believes that they are transmitting their confidential information to a reputable website, thus circumventing the intervention. Furthermore, users are not always as diligent as they should be about entering or updating their sensitive data into a security product such as NIS.

What is needed is an effective and automated way to protect confidential and sensitive information from deceptive and fraudulent e-mail campaigns. It would be desirable to recognize the attempted transmission of confidential and/or sensitive information to seemingly illicit destinations prior to the information's release. The present invention addresses these and other problems, as well as provides additional benefits.

DISCLOSURE OF INVENTION

Methods, apparatuses, and computer-readable media protect sensitive data from being submitted in response to malicious e-mail. Responsive to initiating interaction with a remote site by clicking on a link, a method for protecting sensitive data from being submitted to a suspicious remote site responsive to a malicious e-mail comprises the steps of determining whether each remote target site a user attempts to access requests input of sensitive data; monitoring transmissions between a user's computer and remote target sites; and determining that a suspicious remote site is attempting to glean sensitive data from the user, responsive to a condition from a group of conditions consisting of: determining that a remote target site the user is attempting to access requests input of sensitive data; and detecting an attempt to transmit sensitive data between the user's computer and a remote target site.

The features and advantages described in this disclosure and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

BRIEF DESCRIPTION OF THE DRAWINGS

These and other more detailed and specific objects and features of the present invention are more fully disclosed in the following specification, reference being to the accompanying drawings, in which.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION OF THE PREFERRED EMBODIMENTS

Figure 1:
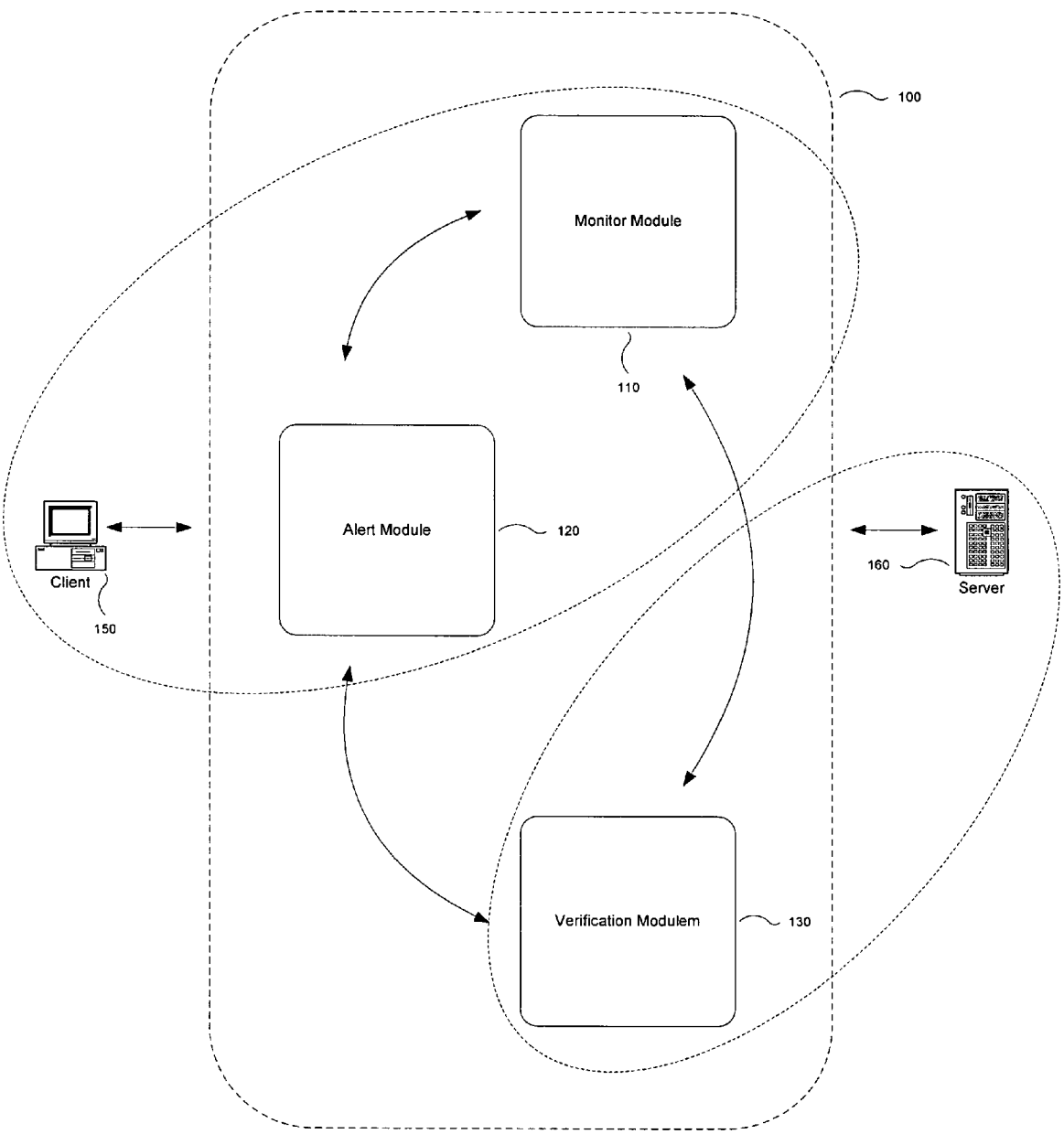
FIG. 1 is a block diagram of a system for protecting sensitive information from being submitted to a suspicious remote site responsive to a malicious e-mail, according to one embodiment of the present invention.

FIG. 1 shows a high level block diagram for protecting sensitive information from being submitted to a suspicious remote site responsive to a malicious e-mail, according to some embodiments of the present invention. A click-through mode manager 100 monitors interactions between a client web browser and a website for the attempted submission of sensitive information. If the website interaction was initiated via a link such as a link found in an e-mail message, the release of the sensitive data is blocked until either the user can knowledgeably override the block, or the interaction with the website is initiated through a reliable means. For purposes of the present invention, "click-through mode" is defined as a state of interaction between a client computer and a remote network site where the interaction was initiated by clicking on a link.

It is to be understood that although the click-through mode manager 100 is illustrated as a single entity, as the term is used herein a click-through mode manager 100 refers to a collection of functionalities which can be implemented as software, hardware, firmware, or any combination of these. Where a click-through mode manager 100 is implemented as software, it can be implemented as a standalone program, but can also be implemented in other ways, for example as part of a larger program, as a plurality of separate programs, as one or more device drivers or as one or more statically or dynamically linked libraries. A click-through mode manager 100 can be instantiated on and/or as part of a server, client, firewall, intrusion detection system, proxy, gateway, switch and/or any combination of these and/or other computing devices and/or platforms.

In one embodiment, a click-through mode manager 100 is comprised of a monitor system 110, an alert system 120, and a verification system 130. While not necessarily residing at the same location or within the same device, the three systems interact amongst themselves to accomplish the functionality of the click-through mode manager 100. According to one embodiment of the present invention, and as shown in FIG. 1, the monitor system 110, the alert system 120, and the verification system 130, reside as a click-through mode manager 100 interposed between, and communicatively coupled to, a client computer 150 and a server 160. In another embodiment the monitor system 110 and the alert system 120 reside within the client computer 150 apart from the verification system 130 without losing any functionality. The verification system 130 can reside within a server 160 and be in communication with the monitor system 110 and alert system 120 without detrimentally impacting the functionality and effectiveness of the click-through mode manager 110.

In one embodiment of the present invention, the monitor system 110 is configured to observe 205 client network activities to detect 210 when a web browser or similar network accessing device initiates a domain connection to a remote site. In doing so the monitor system examines 215 whether the interaction between the client browser and the remote site was initiated through suspicious means. When the investigation confirms that the web browser is in click-through mode, the monitor system 110 observes the interactions between the client and the remote site to identify 230 either attempts by the remote site to glean sensitive information from the user, or the attempts by the user to transmit sensitive data between the client computer 150 and the remote site. The monitor system 110 communicates the attempted conveyance of sensitive data to the verification system 130 while temporarily blocking 235 the data transmission to the remote site.

Upon receiving notice of the attempted conveyance from the monitor system 110, the verification system 130 identifies 410 sensitive data, such as an n-digit data string, for analysis. In one embodiment, at least one cryptographic algorithm is applied 420 to the n-digit string to verify 430 that the data string is sensitive or confidential in nature. Once verified 430, the result is communicated 460 back to the monitor system 110 and the alert system 120. The alert system 120 notifies 140 the user that the submission of sensitive or confidential information is about to occur to a remote site whose reliability and veracity is suspect. When the user communicates 245 that he or she does not wish to convey the data to a remote site initiated via suspect means, the alert system 120 prompts 250 the user to reconnect to the site using a more reliable alternate means such as manually entering the URL into the address bar of a web browser or using a bookmark/favorite option of the client computer's web browser.

While the verification and alert steps transpire, the monitor system 110 continues to monitor 205 the type of connection that exists between the client web browser and the remote site. Upon the user reconnecting using a more reliable initiating methodology, the monitor system removes 265 the click-through designation of the remote site and permits transmission of sensitive data.

Figure 2:
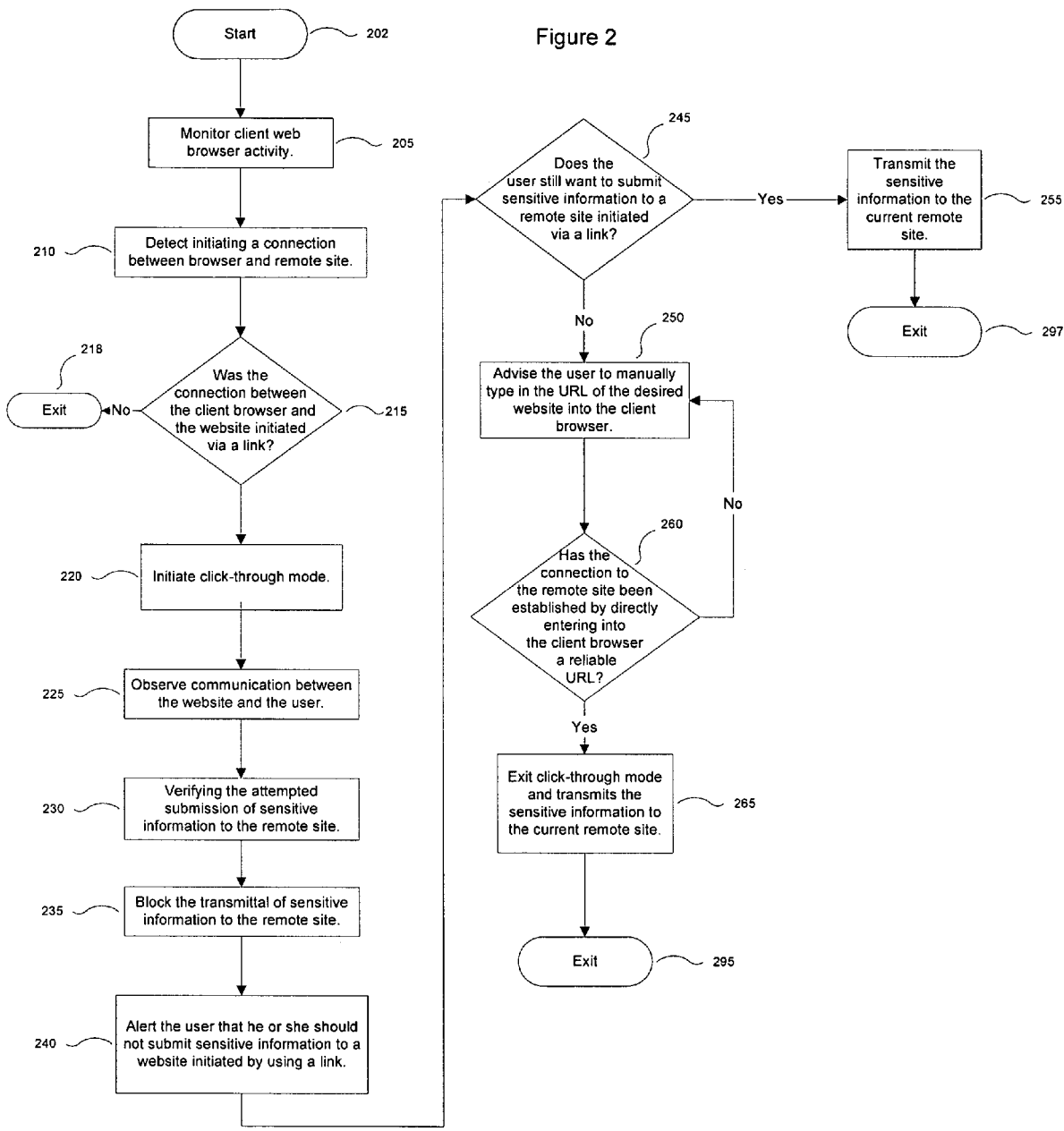
FIG. 2 is a flow diagram of one method embodiment to protect sensitive information from being submitted to a suspicious remote site responsive to a malicious e-mail.

FIG. 2 is a flow diagram illustrating steps, according to one embodiment of the present invention, for protecting sensitive data from being submitted to a suspicious remote site responsive to a malicious e-mail. Confidential and/or sensitive data includes items such as credit card numbers, social security numbers, bank account numbers, driver's license numbers, and the like. Many of these numbers are used either to conduct financial transactions on-line, or to verify an individual's capacity to conduct financial transactions.

The click-through mode manager 100 addresses the need to protect sensitive data from unwitting submission to a remote site in response to a malicious e-mail by monitoring 205 a user's network activity through a client web browser or the like. In one embodiment of the present invention, a client computer 150 is communicatively coupled to a network 350 such as the Internet. The client computer 150 possesses the ability to interact with and display web pages using a device such as a client web browser. Examples of web browsers that are adaptable to display and interact with a website of the user's choice include Internet Explorer®, Mozilla®, Safari®, etc. As will be readily apparent to one skilled in the relevant art, the client computer 150 also possesses the ability to communicate electronically via the network 350 by using an e-mail client. E-mail clients include software programs such as Outlook®, Outlook Express®, Eudora, Pegasus, and the like. A client computer's 150 e-mail client and web browser are typically capable of interacting and exchanging information between themselves. For example, e-mails can often display static images of a web page and can provide a link to a domain or remote website. Likewise web browsers have the ability to act as a portal for e-mail and other forms of electronic communication via a domain.

As described herein, malicious e-mail attacks (sometimes referred to as phishing) take advantage of the inherent interaction between e-mail clients and web browsers. The click-through mode manager 100 detects 210 a client web browser's initiation of a connection to a remote site through an outside link 215. Such an outside link 215 can be presented to the user in an e-mail received through an e-mail client such as Outlook®. As previously defined, this type of network connection is identified 220 as a "click-though" connection and places the web browser in a click-though mode. In click-through mode it is not reliably known to what URL the web browser has been directed. Unlike manually typing the URL in the address bar or selecting a site via the web browser's bookmark/favorite function, the actual URL address delivered to the web browser via a link is unknown to the user despite what is displayed in the client browser's address bar.

Click-though mode can be entered by clicking on a link found in an e-mail or in a webpage. As a result, the web browser is directed, often unintentionally, to a different or new website. For example, a legitimate yet compromised website can contain a suspect link that would direct a user to a remote site outside the current domain. Clicking on such a suspect link would cause the click-through mode manager 100 to enter click-though mode and prevent the submission of sensitive data, while other legitimate links on the web page would not result in such an action. As is apparent to one skilled in the art of web page construction, the determination that a remote site is suspect, malicious, or fraudulent depends on a variety of factors and considerations selected by the user. One such consideration is the nature of communication that transpires between the client and the remote site.

Once the client browser is in click-through mode, the click-through mode manager 100 observes 225 communications between the remote site and the client computer 150. The click-through mode manager 100 verifies 230 a user's attempted submission of confidential or sensitive data by performing, in one embodiment, a check sum analysis of the sensitive data that the user is attempting to submit. Responsive to the submitted data being verified as sensitive, the click-through mode manager 100 blocks 235 the transmission of the data and/or alerts 240 the user with regard to the risk of transmitting sensitive data to a remote site while the web browser is in click-though mode.

While maintaining the block of transmitting the sensitive data, the click-through mode manager 100 queries 245 the user whether he or she would like to transmit the sensitive data to a remote site whose network interaction was originated by clicking on a link located in a suspect e-mail. When the user elects to transmit sensitive data despite the risk, the click-through mode manager 100 overrides 245 the transmission block and transmits 255 the sensitive data to the remote site. A negative answer to the query prompts the user to be advised 250 of alternatives to establish reliable network connection with a domain. One such alternative is to manually either enter the URL in the web browser's address bar or similar network interaction system. Another reliable alternative is to select the domain via a bookmark or favorite that the user has previously established with the client browser based on a reliable interaction with a site. Upon the click-through mode manager 100 determining 260 the web browser has been directed to a web site via a reliable URL source, the web browser exits click-through mode and transmits 265 the sensitive data to the active site.

Figure 3:
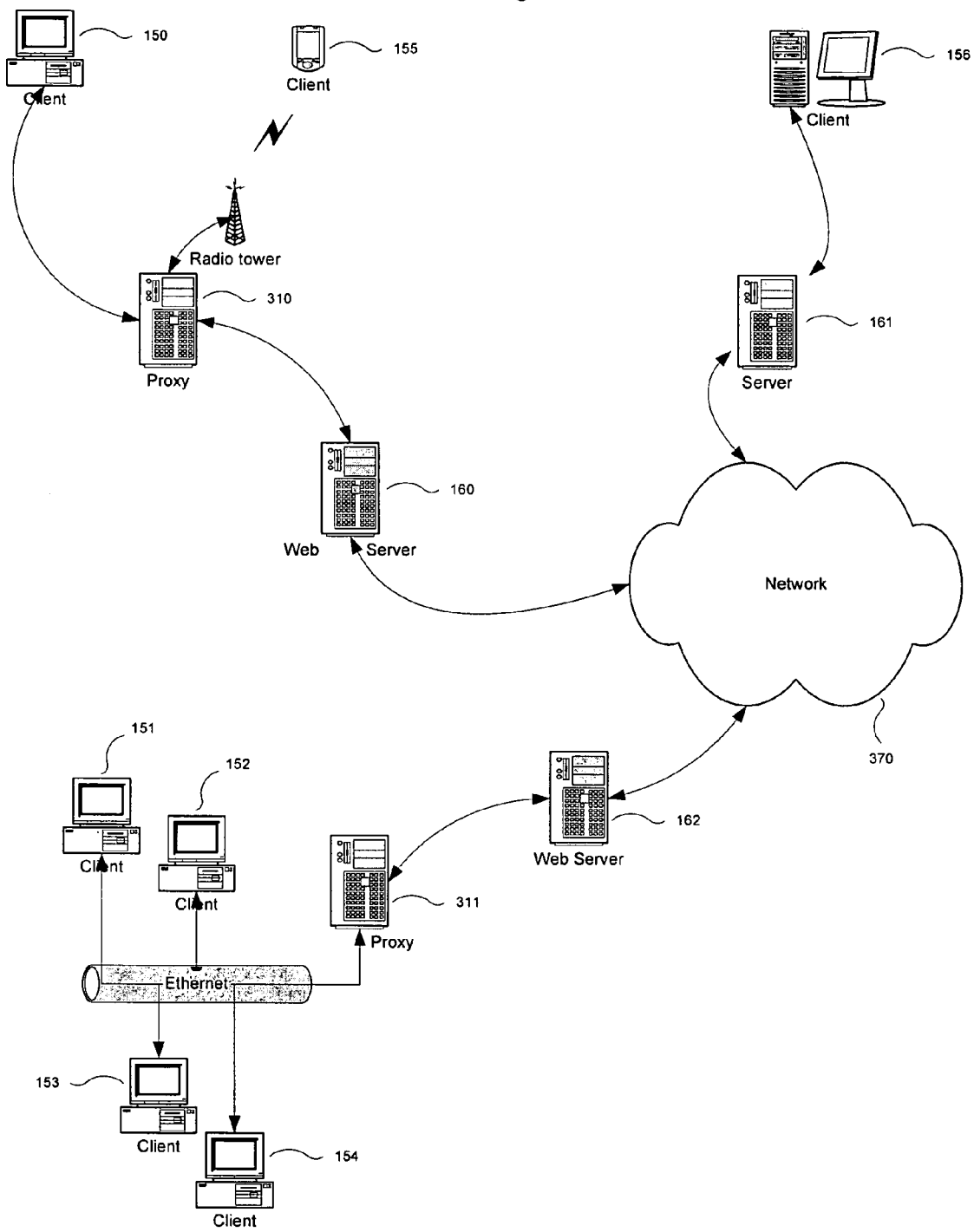
FIG. 3 is block diagram of an exemplary network configuration for protecting sensitive information from being submitted to a suspicious remote site responsive to a malicious e-mail, according to one embodiment of the present invention.

FIG. 3 illustrates a network configuration for protecting sensitive data from being submitted to suspicious remote sites responsive to a malicious e-mail according to one embodiment of the present invention. The click-through mode manager 100 can be employed in a variety of configurations and in a variety of network 370 environments. One configuration is to house the click-through mode manager 100 in a proxy server 310 interposed between a client computer 150 and a web server 160. In another embodiment the click-through mode manager 100 can be configured to have the monitor system 110 and the alert system 120 resides on a client computer 156 while the verification system 130 resides external to the client computer 156 such as on a server 161. The distributive nature of the click-through mode manager 100 allows network 370 interaction through many differing configurations. To ensure that the click-through mode manager 100 remains capable to monitor 205 and interact with a client computer's means of interacting with a network, the monitor system 110 and alert system 120 are ideally resident in or in direct communication with the client computer 150, 151, 152, . . . n, and its associated web browser. In another embodiment of the present invention, the verification system 130 can be employed separately at a corporate or network gateway to alert a system administrator, or the like, that attempts to communicate sensitive data outside a particular network environment to a site initiated through a unverified URL is ongoing.

Figure 4:
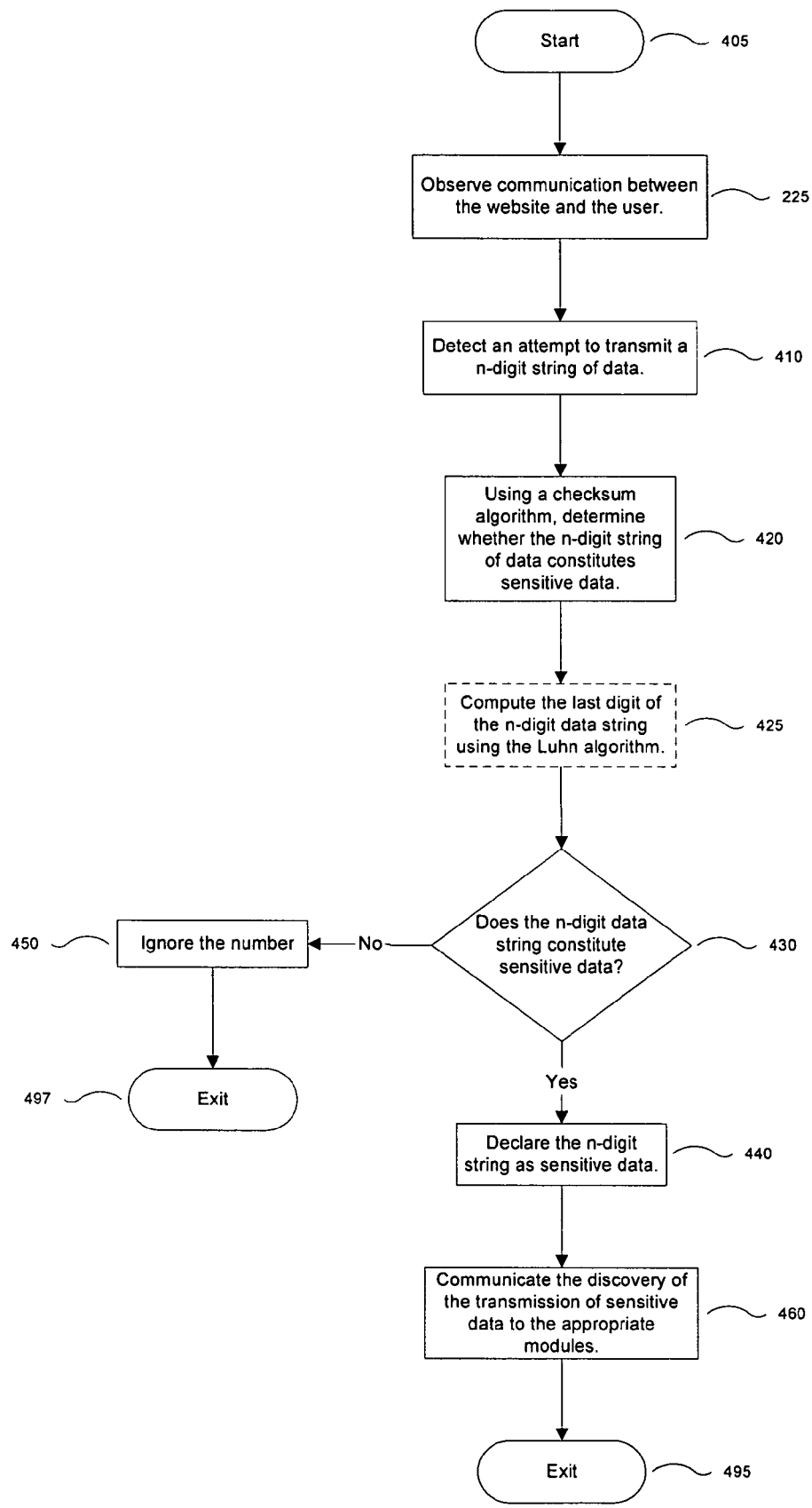
FIG. 4 is a flow diagram of one method to detect and protect sensitive information from being submitted to a suspicious remote site by applying a cryptographic algorithm to the data, according to one embodiment of the present invention.

FIG. 4 illustrates a flow diagram for protecting sensitive data by applying a cryptographic algorithm to a data string according to one embodiment of the present invention. As the click-through mode manager 100 observes 225 network communications between a client computer 150 and a network 370, the verification system 130 employs at least one cryptographic algorithm to determine the data string's nature. Many data strings possess inherent cryptographic properties. Credit card numbers, for example, are created so that the last digit serves as a verification of the previous 15 digits. The Luhn algorithm is a check sum algorithm that creates the $16^{th}$ digit of a credit card number based on the first 15 numbers. Thus the application of the Luhn algorithm to the first 15 digits of a 16 digit number will provide a strong indication whether the 16 digit number is a valid credit card number. While it is possible to create a 16 digit number that passes the Luhn test and not be a credit card number, the likelihood of such a false positive is low. Furthermore, the Luhn algorithm is not the only way to determine whether a number is a credit card number. For example, the verification code on the back of a credit card also provides insight as to the numbers validity. Likewise, other numbers such as bank account numbers, driver's license numbers, and the like can be verified using cryptographic techniques known to one skilled in the relevant art.

In one embodiment, the click-through mode manager 100 identifies 410 an n-digit data string being submitted via a network connection. The data string can be transmitted as one number or broken into smaller segments such as n segments of m digits each where m may or may not equal n. At least one cryptographic algorithm, such as the Luhn algorithm, is used to verify 420 the sensitive natures of the n-digit data string. When the n-digit data string fails to match 430 any known cryptographic pattern for sensitive data, the number is ignored 450 and the block preventing the data strings transmission is removed. In situations where the n-digit number matches a known cryptographic technique, the n-digit data string is declared 440 sensitive data. This declaration and classification of the n-digit data string is conveyed 460 to the monitor system 110 and the alert system 120 for further action.

As will be understood by those familiar with the art, the invention may be embodied in other specific forms without departing from the spirit or essential characteristics thereof. Likewise, the particular naming and division of the modules, managers, systems, functions, layers, features, attributes, methodologies and other aspects are not mandatory or significant, and the mechanisms that implement the invention or its features may have different names, divisions and/or formats. Furthermore, as will be apparent to one of ordinary skill in the relevant art, the modules, managers, functions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. The above description is included to illustrate the operation of various embodiments of the invention and the elements and steps of the various embodiments described above can be combined to provide further embodiments. Additionally, the present invention is in no way limited to implementation in any specific programming language, or for any specific operating system or environment. Accordingly, the disclosure of the present invention is intended to be illustrative, but not limiting, of the scope of the invention, which is set forth in the following claims.

What is claimed is:

1. A method for protecting sensitive data from being submitted to a remote target site responsive to an e-mail, the method comprising the steps of:
    detecting, by a computer, the initiation of click-through mode, responsive to a user clicking on a link in the e-mail to establish a connection with the remote target site, wherein the identity of the remote target site cannot be determined while in click-through mode;
    responsive to detecting the initiation of click-through mode, monitoring, by the computer, transmissions between the computer and the remote target site for attempts by the remote target site to glean sensitive data from the user;
    determining, by the computer, that the remote target site is attempting to glean sensitive data from the user, responsive to a condition from a group of conditions consisting of:
        determining that the remote target site is requesting input of sensitive data; and
        detecting an attempt to transmit sensitive data between the computer and the remote target site;
    blocking, by the computer, submission of the sensitive data, responsive to determining that the remote target site is attempting to glean sensitive data from the user;
    responsive to establishing an other connection with the remote target site where the identity of the remote target site is determined, terminating, by the computer, click-through mode; and
    responsive to terminating click-through mode, permitting, by the computer, the submission of the sensitive data to the remote target site and ending the monitoring of transmissions between the computer and the remote target site.

2. The method of claim 1 wherein:
    the step of determining that remote target site is requesting input of sensitive data further comprises examining the remote target site for at least one suspicious field.

3. The method of claim 2 wherein the step of examining the remote target site for at least one suspicious field further comprises:
    examining the remote target site for at least one field from a group of fields consisting of:
        a data input field requesting sensitive data;
        a field labeled password;
        a field labeled credit card; and
        a field labeled social security number.

4. The method of claim 1 wherein detecting an attempt to transmit sensitive data between the computer and the remote target site further comprises:
    detecting that the user is attempting to transmit an n-digit number, where n is a length of a type of number known to constitute sensitive data; and
    determining whether the n-digit number constitutes sensitive data.

5. The method of claim 4 wherein the determining step further comprises computing a value of a check digit of the n-digit data number using a checksum algorithm.

6. The method of claim 5 wherein:
    the step of computing the value of the check digit using a checksum algorithm further comprises computing the value of the last digit of the n-digit number using the Luhn algorithm for computing a value of a last digit of a credit card number; and
    the step of determining whether the n-digit number constitutes sensitive data further comprises performing a step from a group of steps consisting of:
    responsive to the value of the last digit of the n-digit number being equal to the value computed using the Luhn algorithm, determining that the n-digit number constitutes a credit card number; and
    responsive to the value of the last digit of the n-digit number not being equal to the value computed using the Luhn algorithm, determining that the n-digit number does not constitute a credit card number.

7. The method of claim 1 further comprising:
    responsive to blocking submission of sensitive data, displaying a warning message to the user requesting whether the user would like to submit the sensitive data to the remote target site despite the remote target site being suspect.

8. The method of claim 7 further comprising:
    responsive to receiving a command from the user to not submit the blocked sensitive data, displaying a message to the user suggesting that the user manually supply a locator of the remote target site to a network interaction system.

9. The method of claim 7 further comprising:
    responsive to receiving a command from the user to not submit the blocked sensitive data, displaying a message to the user suggesting that the user access a bookmarked locator of the remote target site.

10. The method of claim 1 wherein the other connection with the remote target site is established responsive to the user manually supplying a locator of the remote target site.

11. The method of claim 1 wherein the other connection with the remote target site is established responsive to the user accessing a bookmarked locator of the remote target site.

12. A system having a processor and a computer-readable storage medium having executable computer program instructions embodied therein for protecting sensitive data from being submitted to a remote target site responsive to an e-mail, the computer program instructions when executed by the processor performing steps comprising:
    detecting the initiation of click-through mode, responsive to a user clicking on a link in the e-mail to establish a connection with the remote target site, wherein the identity of the remote target site cannot be determined while in click-through mode;
    responsive to detecting the initiation of click-through mode, monitoring transmissions between the user's computer and the remote target site for attempts by the remote target site to glean sensitive data from the user;
    determining that a suspicious remote site is attempting to glean sensitive data from the user, responsive to a condition from a group of conditions consisting of:
        determining that the remote target site is requesting input of sensitive data; and
        detecting an attempt to transmit sensitive data between the user's computer and the remote target site;
    blocking submission of the sensitive data, responsive to determining that the remote target site is attempting to glean sensitive data from the user;
    responsive to establishing an other connection with the remote target site where the identity of the remote target site is determined, terminating click-through mode; and
    responsive to terminating click-through mode, permitting the submission of the sensitive data to the remote target site and end the monitoring of transmissions between the user's computer and the remote target site.

13. The system of claim 12 wherein determining that the remote target site is requesting input of sensitive data further comprises examining the remote target site for at least one suspicious field.

14. The system of claim 13 wherein examining the remote target site for at least one suspicious field further
examining each remote target site for at least one field from a group of fields consisting of:
a data input field requesting sensitive data;
a field labeled password;
a field labeled credit card; and
a field labeled social security number.

15. The system of claim 12 wherein detecting an attempt to transmit sensitive data between the user's computer and the remote target site further comprises:
detecting that the user is attempting to transmit an n-digit number, where n is a length of a type of number known to constitute sensitive data; and
determining whether the n-digit number constitutes sensitive data.

16. The system of claim 15 wherein determining whether the n-digit number constitutes sensitive data further comprises computing a value of a check digit of the n-digit data number using a checksum algorithm.

17. The system of claim 16 wherein:
computing the value of the check digit using a checksum algorithm further comprises computing the value of the last digit of the n-digit number using the Luhn algorithm for computing a value of a last digit of a credit card number; and
determining whether the n-digit number constitutes sensitive data further comprises performing a step from a group of steps consisting of:
responsive to the value of the last digit of the n-digit number being equal to the value computed using the Luhn algorithm, determining that the n-digit number constitutes a credit card number; and
responsive to the value of the last digit of the n-digit number not being equal to the value computed using the Luhn algorithm, determining that the n-digit number does not constitute a credit card number.

18. The system of claim 12 further comprising:
responsive to blocking submission of sensitive data, displaying a warning message to the user requesting whether the user would like to submit the sensitive data to the remote target site despite the remote target site being suspect.

19. The system of claim 18 further comprising responsive to receiving a command from the user to not submit the blocked sensitive data, displaying a message to the user suggesting that the user manually supply a locator of the remote target site to a network interaction system.

20. The system of claim 18 further comprising responsive to receiving a command from the user to not submit the blocked sensitive data, displaying a message to the user suggesting that the user access a bookmarked locator of the remote target site.

21. The system of claim 12 wherein the other connection with the remote target site is established responsive to the user manually supplying a locator of the remote target site.

22. The system of claim 12 wherein the other connection with the remote target site is established responsive to the user accessing a bookmarked locator of the remote target site.

23. At least one computer-readable storage medium containing computer program instructions for protecting sensitive data from being submitted to a remote target site responsive to an e-mail, the computer program instructions performing the steps of:
detecting the initiation of click-through mode, responsive to a user clicking on a link in the e-mail to establish a connection with the remote target site, wherein the identity of the remote target site cannot be determined while in click-through mode;
responsive to detecting the initiation of click-through mode, monitoring transmissions between the user's computer and the remote target site for attempts by the remote target site to glean sensitive data from the user;
determining that the remote target site is attempting to glean sensitive data from the user, responsive to a condition from a group of conditions consisting of:
determining that the remote target site is requesting input of sensitive data; and
detecting an attempt to transmit sensitive data between the user's computer and the remote target site;
blocking submission of the sensitive data, responsive to determining that the remote target site is attempting to glean sensitive data from the user;
responsive to establishing an other connection with the remote target site where the identity of the remote target site is determined, terminating click-through mode; and
responsive to terminating click-through mode, permitting the submission of the sensitive data to the remote target site and ending the monitoring of transmissions between the user's computer and the remote target site.

24. The at least one computer-readable medium of claim 23 wherein:
the step of determining that the remote target site is requesting input of sensitive data further comprises examining the remote target site for at least one suspicious field.

25. The at least one computer-readable medium of claim 24 wherein the step of examining the remote target site for at least one suspicious field further comprises computer program instructions performing the step of:
examining each remote target site for at least one field from a group of fields consisting of:
a data input field requesting sensitive data;
a field labeled password;
a field labeled credit card; and
a field labeled social security number.

26. The at least one computer-readable medium of claim 23 wherein detecting an attempt to transmit sensitive data between the user's computer and the remote target site further comprises computer program instructions performing the steps of:
detecting that the user is attempting to transmit an n-digit number, where n is a length of a type of number known to constitute sensitive data; and
determining whether the n-digit number constitutes sensitive data.

27. The at least one computer-readable medium of claim 26 wherein the determining step further comprises computer program instructions performing the step of computing a value of a check digit of the n-digit data number using a checksum algorithm.

28. The at least one computer-readable medium of claim 27 wherein:
the step of computing the value of the check digit using a checksum algorithm further comprises computing the value of the last digit of the n-digit number using the Luhn algorithm for computing a value of a last digit of a credit card number; and the step of determining whether the n-digit number constitutes sensitive data further comprises performing a step from a group of steps consisting of:

responsive to the value of the last digit of the n-digit number being equal to the value computed using the Luhn algorithm, determining that the n-digit number constitutes a credit card number; and responsive to the value of the last digit of the n-digit number not being equal to the value computed using the Luhn algorithm, determining that the n-digit number does not constitute a credit card number.

29. The at least one computer-readable medium of claim 23 further comprising computer program instructions performing the step of:

responsive to blocking submission of sensitive data, displaying a warning message to the user requesting whether the user would like to submit the sensitive data to the remote target site despite the remote target site being suspect.

30. The at least one computer-readable medium of claim 29 further comprising computer program instructions performing the step of:

responsive to receiving a command from the user to not submit the blocked sensitive data, displaying a message to the user suggesting that the user manually supply a locator of the remote target site to a network interaction system.

31. The at least one computer-readable medium of claim 29 further comprising computer program instructions performing the step of:

responsive to receiving a command from the user to not submit the blocked sensitive data, displaying a message to the user suggesting that the user access a bookmarked locator of the remote target site.

32. The at least one computer-readable medium of claim 23 wherein the other connection with the remote target site is established responsive to the user manually supplying a locator of the remote target site.

33. The at least one computer-readable medium of claim 23 wherein the other connection with the remote target site is established responsive to the user accessing a bookmarked locator of the remote target site.

* * * * *

UNITED STATES PATENT AND TRADEMARK OFFICE
CERTIFICATE OF CORRECTION

PATENT NO. : 7,617,532 B1
APPLICATION NO. : 11/041325
DATED : November 10, 2009
INVENTOR(S) : Christopher Alexander Page 1 of 1

It is certified that error appears in the above-identified patent and that said Letters Patent is hereby corrected as shown below:

Column 9, line 6, after "further" insert -- comprises: --.

Signed and Sealed this

Eighteenth Day of May, 2010

David J. Kappos
*Director of the United States Patent and Trademark Office*